United States Patent
Giacomin

(10) Patent No.: US 9,629,492 B2
(45) Date of Patent: Apr. 25, 2017

(54) AC AND/OR DC VOLTAGE POWERED MACHINE FOR PREPARING ESPRESSO COFFEE AND OTHER INFUSED DRINKS AND BEVERAGES

(76) Inventor: Lorenzo Giacomin, Conegliano (IT)

( * ) Notice: Subject to any disclaimer, the term of this patent is extended or adjusted under 35 U.S.C. 154(b) by 931 days.

(21) Appl. No.: 13/885,014

(22) PCT Filed: Nov. 12, 2010

(86) PCT No.: PCT/IT2010/000452
§ 371 (c)(1),
(2), (4) Date: May 13, 2013

(87) PCT Pub. No.: WO2012/063273
PCT Pub. Date: May 18, 2012

(65) Prior Publication Data
US 2013/0233175 A1    Sep. 12, 2013

(51) Int. Cl.
*A47J 31/00* (2006.01)
*A47J 31/36* (2006.01)
(Continued)

(52) U.S. Cl.
CPC ......... *A47J 31/005* (2013.01); *A47J 31/3614* (2013.01); *A47J 31/3619* (2013.01);
(Continued)

(58) Field of Classification Search
CPC .. A47J 31/005; A47J 31/3604; A47J 31/3609; A47J 31/3614; A47J 31/3619;
(Continued)

(56) References Cited

U.S. PATENT DOCUMENTS 2,543,528 A * 2/1951 Kaufmann ............ A47J 31/043
99/285
3,181,732 A * 5/1965 Immermann ........... A47J 31/40
222/129.3
(Continued)

FOREIGN PATENT DOCUMENTS

CH    EP 1 277428 A1    1/2003
CH    WO2006/102980    10/2006
(Continued)

OTHER PUBLICATIONS

International Search Report in PCT/IT2010/000452 mailed Jul. 22, 2011.

*Primary Examiner* — Sean Michalski
(74) *Attorney, Agent, or Firm* — Bucknam & Archer

(57) ABSTRACT

A low DC and/or AC voltage machine for preparing espresso coffee or other beverages, having a support structure provided with a heat exchanger, one or more heating elements with low energy consumption for heating water in a container, a water circulation pump, thermostats for adjusting the water temperature, a solenoid valve and a filtering and delivering unit, provided with a fixed portion communicating with the heat exchanger and a movable portion formed by a filter supporting body shaped for housing a cup, supporting the capsule containing the metered powder of the beverage, or a filter for receiving the loose powder, or a filter for receiving a paper waffle. The filter supporting body may be displaced from a lowered position for loading the element for preparing the beverage, to a raised position for the infusion of the beverage, and again in the lower position for discharging the exhausted element.

8 Claims, 14 Drawing Sheets

(51) Int. Cl.
*A47J 31/44* (2006.01)
*A47J 31/54* (2006.01)

(52) U.S. Cl.
CPC ....... *A47J 31/3633* (2013.01); *A47J 31/3666* (2013.01); *A47J 31/4467* (2013.01); *A47J 31/542* (2013.01)

(58) Field of Classification Search
CPC ... A47J 31/3666; A47J 31/3676; A47J 31/368
USPC .......................................................... 99/280
See application file for complete search history.

(56) References Cited

U.S. PATENT DOCUMENTS

| | | | | |
|---|---|---|---|---|
| 3,485,162 A * | 12/1969 | Hopkinson | ......... | A47J 31/3695 99/283 |
| 3,596,588 A * | 8/1971 | Moss | ..... | A47J 31/005 392/451 |
| 3,828,383 A * | 8/1974 | Johnstone | ......... | B23Q 5/041 408/9 |
| 3,998,143 A * | 12/1976 | Frye | ......... | A47J 31/505 219/436 |
| 4,073,192 A * | 2/1978 | Townsend | ......... | G01F 19/005 73/429 |
| 4,124,332 A * | 11/1978 | Nishijyo | ......... | F04D 15/0011 417/26 |
| 4,271,752 A * | 6/1981 | Valente | ......... | A47J 31/3619 99/289 R |
| 4,279,364 A * | 7/1981 | Perez | ......... | A47J 47/01 222/162 |
| 4,343,988 A * | 8/1982 | Roller | ......... | A47J 31/545 165/165 |
| 4,421,014 A * | 12/1983 | Vicker | ......... | A47J 31/38 99/289 P |
| 4,429,623 A * | 2/1984 | Illy | ......... | A47J 31/0668 99/295 |
| 4,452,130 A * | 6/1984 | Klein | ......... | A47J 31/005 99/307 |
| 4,748,901 A * | 6/1988 | Burmeister | ......... | A47J 31/0573 99/295 |
| 4,841,849 A * | 6/1989 | Shimomura | ......... | A47J 31/42 99/282 |
| 5,307,734 A * | 5/1994 | Lussi | ......... | A47J 31/3609 99/287 |
| 5,316,781 A * | 5/1994 | Lussi | ......... | A47J 31/3619 426/433 |
| 5,376,953 A * | 12/1994 | Voelker | ......... | B41J 25/316 347/211 |
| 5,406,882 A * | 4/1995 | Shaanan | ......... | A47J 31/18 99/287 |
| 5,417,145 A * | 5/1995 | Joseph, Jr. | ......... | A47J 42/44 241/33 |
| 5,531,152 A * | 7/1996 | Gardosi | ......... | A47J 31/368 99/289 R |
| 5,598,764 A * | 2/1997 | Bambi | ......... | A47J 31/002 99/295 |
| 5,638,991 A * | 6/1997 | Todden | ......... | B67D 1/0006 222/113 |
| 5,694,115 A * | 12/1997 | Desatoff | ......... | A47J 31/44 307/140 |
| 5,724,883 A * | 3/1998 | Usherovich | ......... | A47J 31/057 426/433 |
| 5,738,001 A * | 4/1998 | Liverani | ......... | A47J 31/36 99/280 |
| 5,899,137 A * | 5/1999 | Miller | ......... | A47J 31/005 426/433 |
| 6,123,010 A * | 9/2000 | Blackstone | ......... | A47J 31/005 99/279 |
| 6,356,425 B1 * | 3/2002 | Jung | ......... | H02H 3/085 307/141 |
| 6,700,340 B2 * | 3/2004 | Wong | ......... | A47J 42/56 318/364 |
| 6,762,975 B2 * | 7/2004 | Wu | ......... | A47J 31/52 219/481 |
| 6,990,891 B2 * | 1/2006 | Tebo, Jr. | ......... | A47J 31/0647 99/295 |
| 7,134,384 B1 * | 11/2006 | Otterberg | ......... | A47J 31/005 99/280 |
| 7,213,505 B2 | 5/2007 | Kollep | | |
| 7,322,274 B2 * | 1/2008 | Wang | ......... | A47J 31/4407 99/280 |
| 7,581,488 B2 * | 9/2009 | Caswell | ......... | A47J 31/42 99/280 |
| 7,707,927 B2 * | 5/2010 | Boussemart | ......... | A47J 31/061 99/275 |
| 7,760,993 B2 * | 7/2010 | You | ......... | D06F 39/008 392/324 |
| 7,813,628 B2 * | 10/2010 | Haan | ......... | F22B 1/288 392/397 |
| 7,966,927 B2 | 6/2011 | Yoakim et al. | | |
| 8,171,843 B1 * | 5/2012 | Heffington | ......... | A47J 31/0573 99/282 |
| 8,215,229 B2 * | 7/2012 | Faccinti | ......... | A47J 31/36 99/280 |
| 8,225,708 B2 * | 7/2012 | Lassota | ......... | A47J 31/56 219/477 |
| 8,307,754 B2 * | 11/2012 | Ternite | ......... | A47J 31/0673 99/280 |
| 8,973,435 B2 * | 3/2015 | Preston | ......... | A47J 31/52 73/202 |
| 2002/0104441 A1 * | 8/2002 | Sowden | ......... | A47J 31/3614 99/277 |
| 2002/0129712 A1 * | 9/2002 | Westbrook | ......... | A47J 31/3676 99/279 |
| 2003/0003208 A1 * | 1/2003 | Lassota | ......... | A47J 31/002 426/433 |
| 2003/0051584 A1 * | 3/2003 | Giannakakos | ......... | B25B 27/143 81/436 |
| 2003/0145736 A1 * | 8/2003 | Green | ......... | A47J 31/3633 99/280 |
| 2003/0167928 A1 * | 9/2003 | Mulle | ......... | A47J 31/42 99/279 |
| 2004/0025703 A1 * | 2/2004 | Ming | ......... | A47J 31/42 99/286 |
| 2004/0123747 A1 * | 7/2004 | Lassota | ......... | A47J 42/50 99/510 |
| 2004/0244599 A1 * | 12/2004 | Wei | ......... | A47J 31/0615 99/279 |
| 2005/0109223 A1 * | 5/2005 | Comte | ......... | A47J 31/3614 99/495 |
| 2005/0150389 A1 * | 7/2005 | Carbonini | ......... | A47J 31/3609 99/279 |
| 2005/0193891 A1 * | 9/2005 | Garson | ......... | A47J 31/3619 99/279 |
| 2006/0096465 A1 * | 5/2006 | Hu | ......... | A47J 31/002 99/280 |
| 2006/0117960 A1 * | 6/2006 | Fischer | ......... | A47J 31/3614 99/279 |
| 2006/0156928 A1 * | 7/2006 | Wang | ......... | A47J 31/3609 99/280 |
| 2006/0174773 A1 * | 8/2006 | Taylor | ......... | A47J 31/46 99/280 |
| 2006/0201339 A1 * | 9/2006 | Vetterli | ......... | A47J 31/42 99/452 |
| 2006/0254428 A1 * | 11/2006 | Glucksman | ......... | A47J 31/3609 99/302 P |
| 2007/0051246 A1 * | 3/2007 | Suzuki | ......... | A47J 31/005 99/275 |
| 2007/0169546 A1 * | 7/2007 | Zalite | ......... | G01F 25/0007 73/202 |
| 2008/0037232 A1 * | 2/2008 | Schroetlin | ......... | A47J 31/52 361/760 |
| 2008/0092746 A1 * | 4/2008 | Clark | ......... | A47J 31/54 99/281 |
| 2008/0190297 A1 * | 8/2008 | Gussmann | ......... | A47J 31/42 99/280 |
| 2008/0202345 A1 * | 8/2008 | Delonghi | ......... | A47J 31/42 99/280 |

(56) References Cited

U.S. PATENT DOCUMENTS

| | | | | |
|---|---|---|---|---|
| 2008/0260927 | A1* | 10/2008 | Steenhof | A47J 31/002 426/569 |
| 2009/0136639 | A1* | 5/2009 | Doglioni Majer | A47J 31/36 426/431 |
| 2009/0272275 | A1* | 11/2009 | De Graaff | A47J 31/405 99/279 |
| 2010/0080886 | A1* | 4/2010 | Hourizadeh | A47J 31/3609 426/595 |
| 2010/0107886 | A1* | 5/2010 | Xiao | D06F 75/12 99/281 |
| 2011/0094389 | A1* | 4/2011 | Coccia | A47J 31/36 99/280 |
| 2011/0200726 | A1* | 8/2011 | Tinkler | A47J 31/32 426/431 |
| 2011/0223302 | A1* | 9/2011 | Star | A23L 2/39 426/425 |
| 2011/0271840 | A1* | 11/2011 | Talon | A47J 31/005 99/275 |
| 2013/0045307 | A1* | 2/2013 | Safai | A47J 31/3676 426/77 |
| 2013/0061764 | A1* | 3/2013 | Rivera | A47J 31/446 99/300 |
| 2013/0263745 | A1* | 10/2013 | Bombeck | A47J 31/20 99/293 |
| 2014/0150663 | A1* | 6/2014 | Leforgeais | A47J 31/3614 99/283 |
| 2014/0261001 | A1* | 9/2014 | Icardi | A47J 31/3633 99/295 |
| 2014/0360379 | A1* | 12/2014 | Radhakrishnan | A47J 31/3609 99/323 |
| 2015/0232183 | A1* | 8/2015 | Godecker | B64D 11/04 244/118.5 |
| 2015/0289705 | A1* | 10/2015 | Van Boxtel | A47J 31/3614 99/289 R |
| 2016/0058233 | A1* | 3/2016 | Anthony | A47J 31/002 426/231 |

FOREIGN PATENT DOCUMENTS

| | | |
|---|---|---|
| CH | EP 1 774 883 A1 | 4/2007 |
| CH | 699 674 A2 | 4/2010 |
| CN | WO02/30250 A1 | 4/2002 |
| ES | 2 253 116 A1 | 5/2006 |
| GB | 2 452 981 | 3/2009 |

* cited by examiner

AC AND/OR DC VOLTAGE POWERED MACHINE FOR PREPARING ESPRESSO COFFEE AND OTHER INFUSED DRINKS AND BEVERAGES

The invention relates to a low DC voltage and optionally an AC voltage powered machine for preparing espresso coffee or other infused beverages, and of a stationary type or transportable on different positions and places, which is able to deliver in a quick manner many drinks and beverages in sequence.

At the present time, the electric machines for preparing coffee or other drinks and infused beverages are installed on stationary positions, from which they cannot be displaced, and are supplied with AC supply voltage of 230 V only. Moreover, such machines are provided with filter supports adapted to receive some filters loaded with the powdered infused beverage to be prepared, or some filters adapted to receive a waffle or a capsule containing such powdered infused beverage.

Therefore, in the machines of this kind the filter lends itself to prepare the infused beverage by introducing the powdered beverage or the waffle of such beverage to be prepared therein, or the machine may be loaded with a capsule of the same beverage, and thus these machines aren't able to prepare the infused beverages by utilizing both the waffles and the capsules as well as the ground coffee.

Furthermore, these machines are provided with high power operated heating elements, involving considerable energetic consumptions for heating water for the infusion at the required high temperatures and for the needed time periods for preparing several doses of the desired infused beverages, and often have cumbersome dimensions.

The object of the present invention is to realize a machine with reduced dimensions for preparing espresso coffee or other infused beverages, in which the above mentioned applicative drawbacks and limits of the currently used machines are eliminated, and which is able to prepare the infused beverages with extremely reduced energetic consumptions, and able to be supplied with low DC voltage, and besides may be loaded with loose powder of the infused beverage and with waffles or capsules containing the powdered infused beverage, and may be installed not only on stationary positions but also on different positions and places, in an easy and quick manner. This machine is realized with the constructive characteristics substantially described, with particular reference to the attached patent claims.

The invention will be understood better from the following description, given by way of a not limitative example only and with reference to the accompanying drawings, in which.

The above mentioned Figures illustrate an espresso coffee machine or for other infused beverages, supplied with a low DC voltage and/or AC voltage, and of stationary type or transportable on different positions and places. This machine is able to be installed into means for inhabited uses, campers, caravans, motor-homes, different kinds of boats, commercial and industrial vehicles such as for example motor-bus, motor coaches, trains, airplanes, trucks, motor-vehicles for private or public use, for domestic and public uses, catering, vending, OCS, Horeca, and leasing to privates or Firms with or without service for supplying raw material (coffee, barley, etc. . . . ) and is able to be transported on to trucks of various kind, which can be utilized on the roads, squares, parks, golf-fields, trains, airplanes etc. . . . and other applications.

In case, the machine may be also provided with systems (deconto or similar) for the leasing market (ocs and similar markets) for mechanically or electronically counting the delivered beverage. The machine is arranged, in the manner which will be described, for preparing coffee and several kinds of infused beverages, such as for example white coffee, barley, tea, camomile, liquid foods etc., by utilizing the loose powder of such beverages or the waffles or the capsules containing such powder, metered and pressed in the best way.

Figure 1:
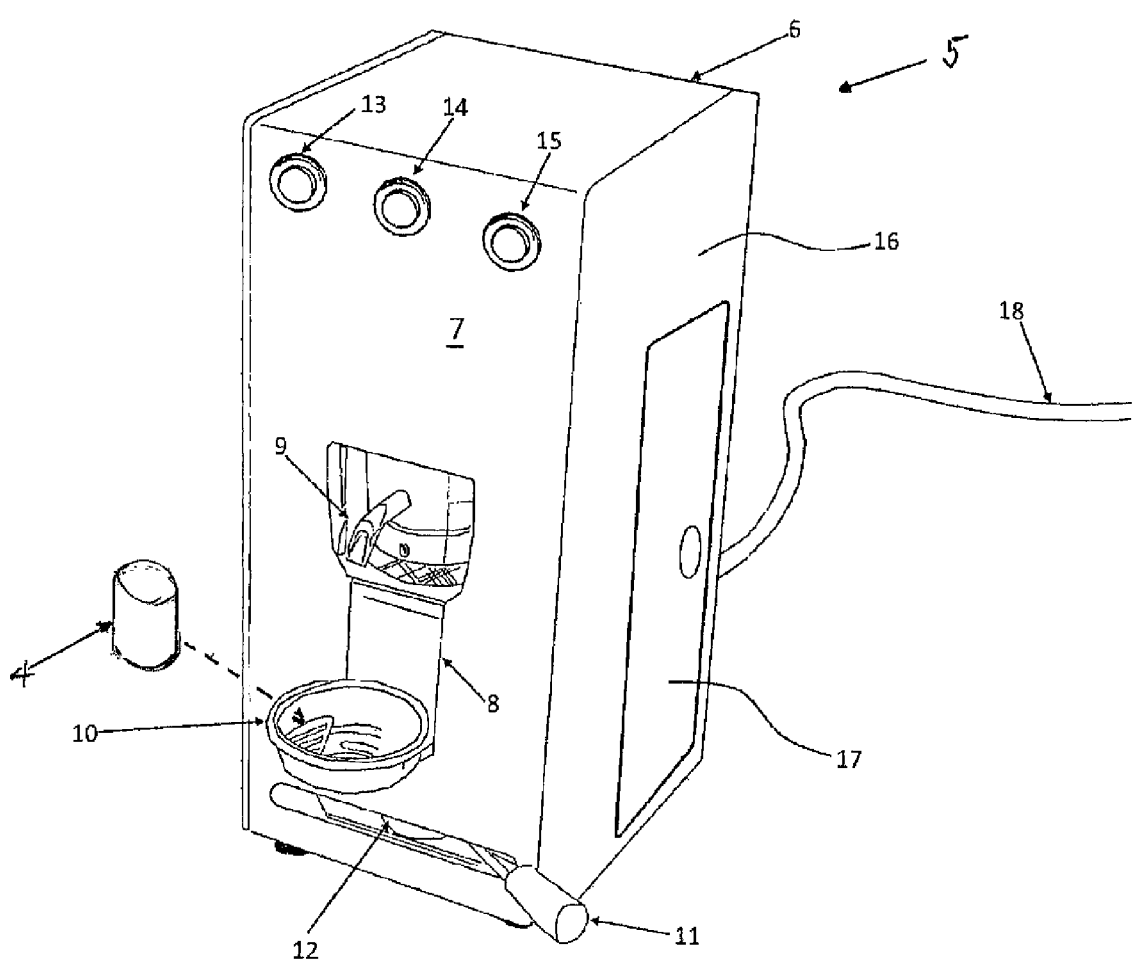
FIG. 1 shows a perspective front view of the machine according to the invention, on an assembled condition thereof and in one of the possible versions thereof.
Figure 2:
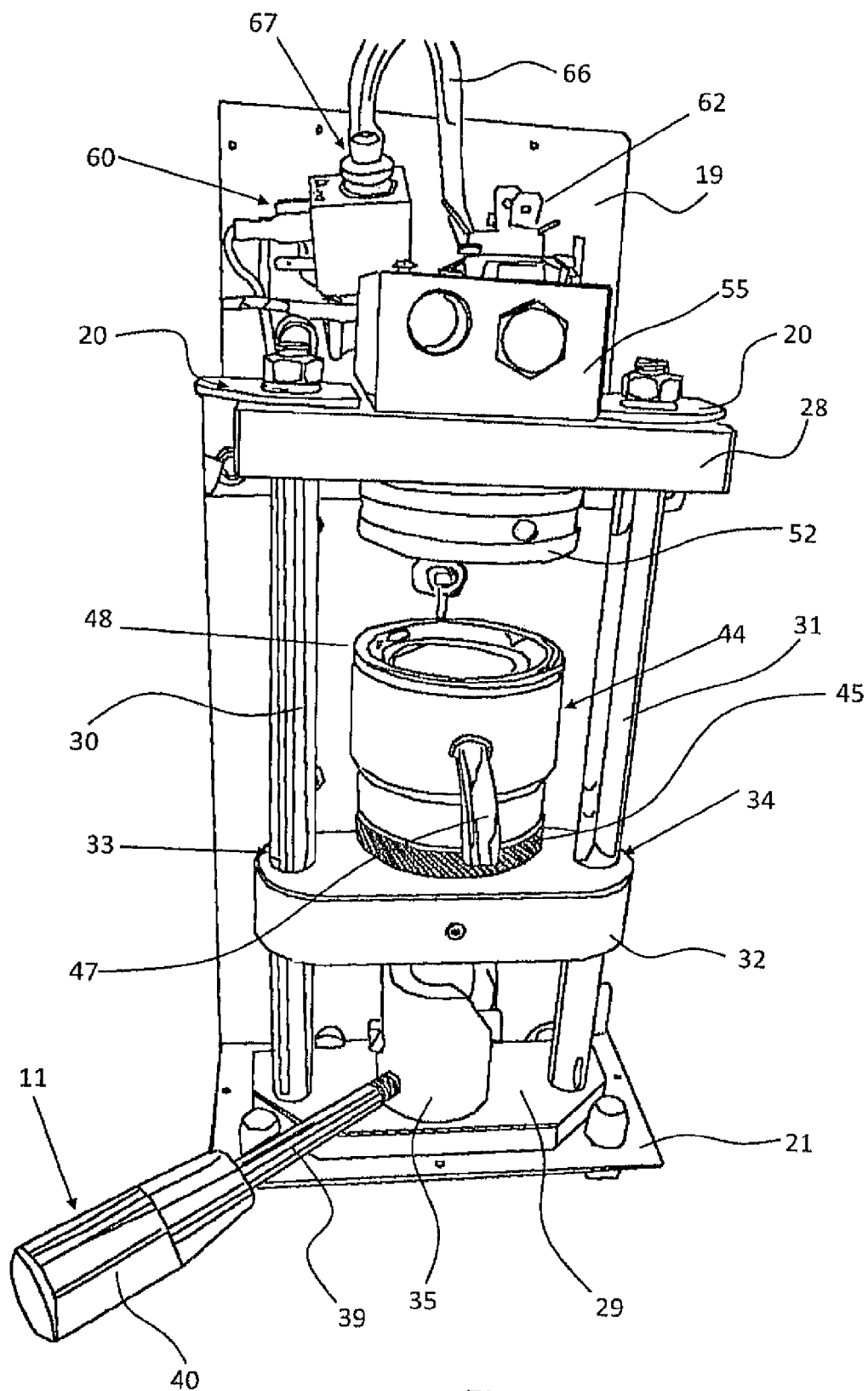
FIG. 2 shows a front view of the machine of FIG. 1, on a disassembled condition thereof.
Figure 3:
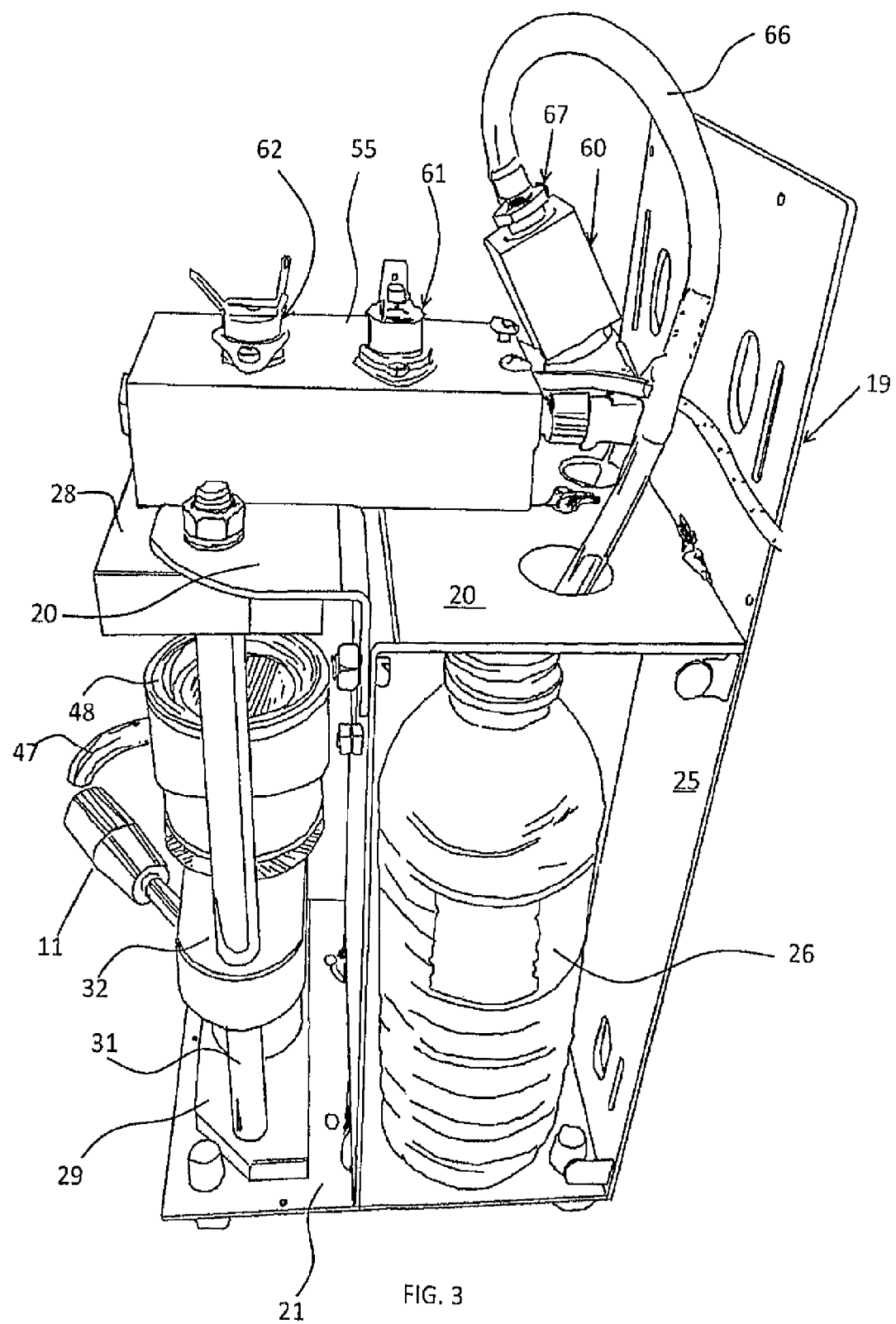
FIG. 3 shows a perspective view taken from a side of the disassembled machine of FIG. 2.
Figure 4:
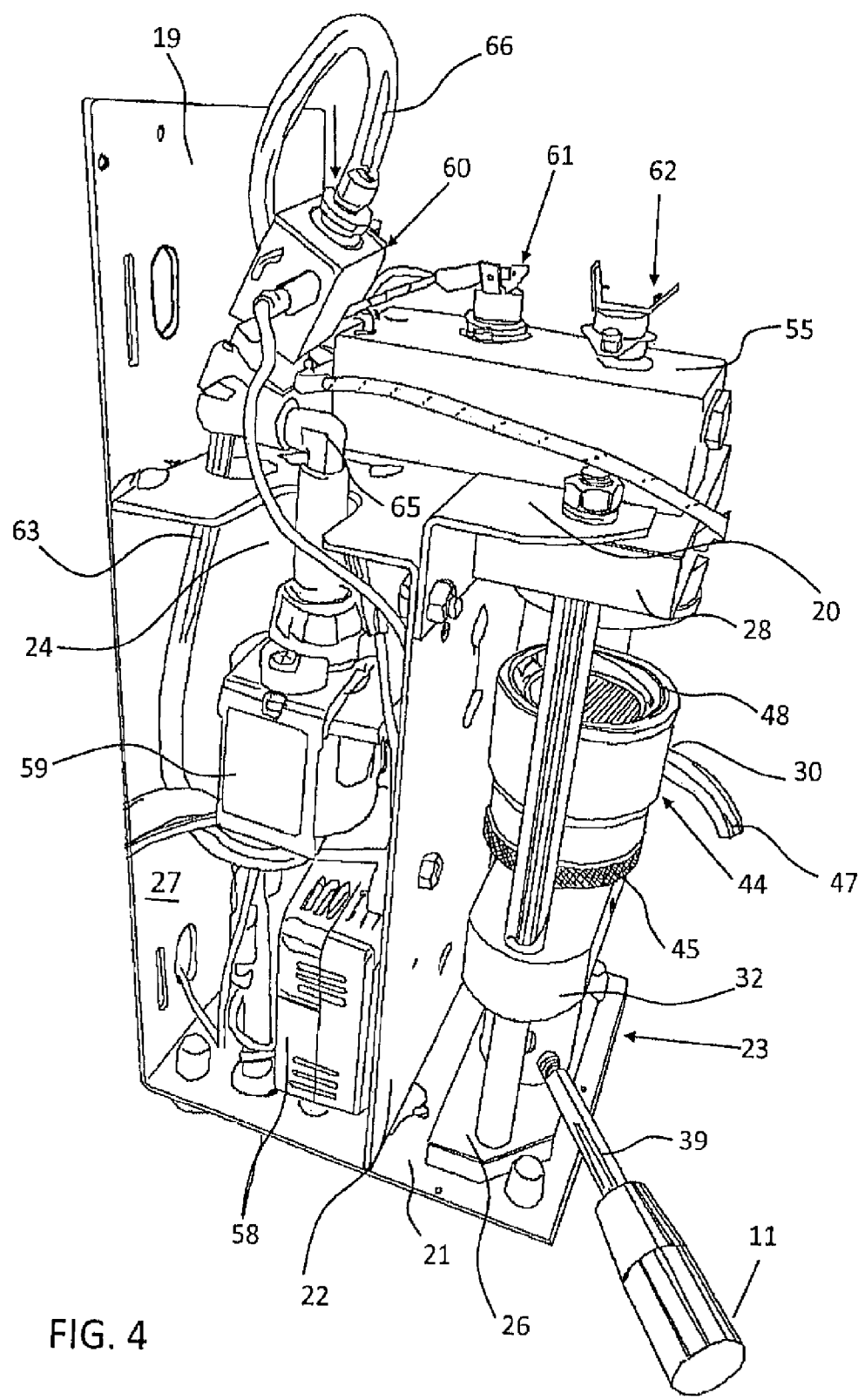
FIG. 4 shows a perspective view taken from the other side of the disassembled machine of FIG. 2.
Figure 5:
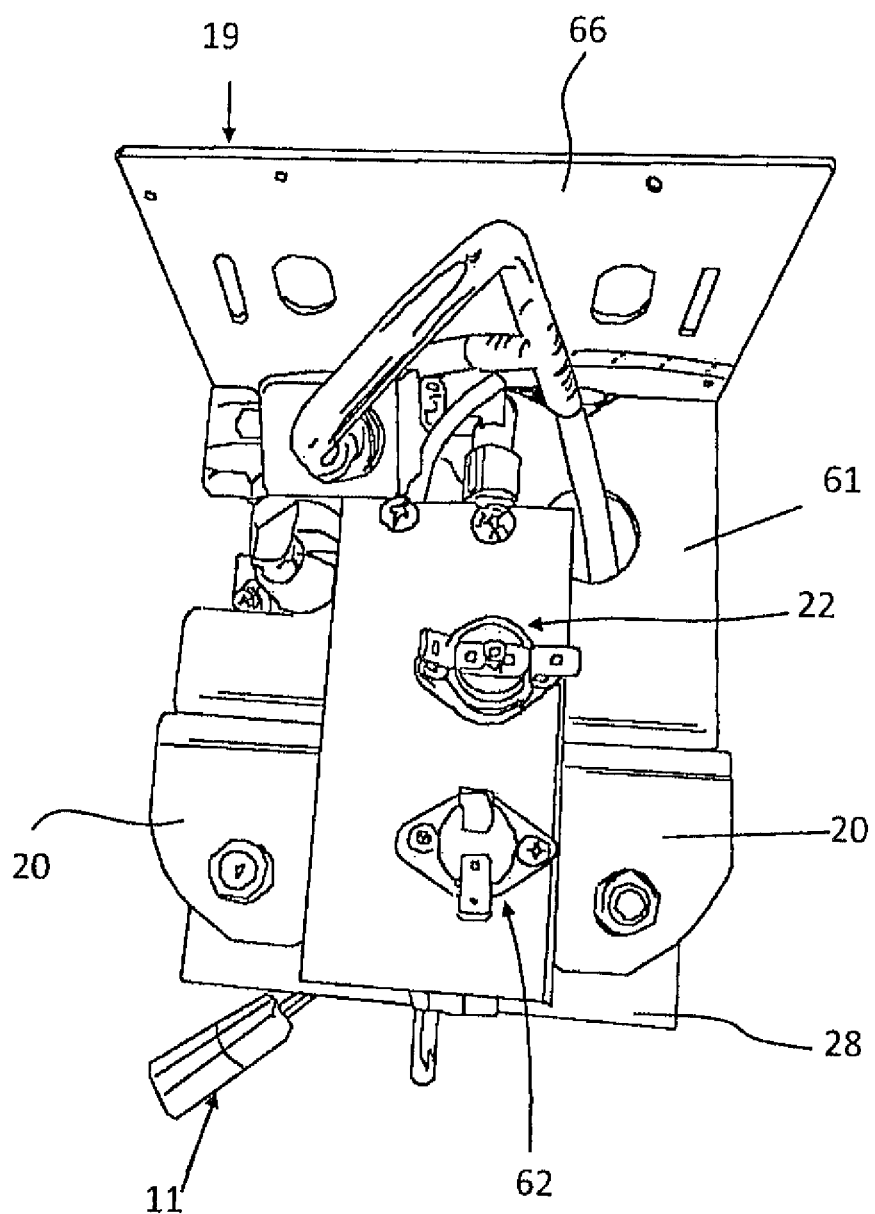
FIG. 5 shows a plan view of the disassembled machine of FIG. 2.

As particularly visible in the FIG. 1, in which the machine 5 is on the assembled condition and in the FIGS. 2-5 in which the machine is on the disassembled condition thereof, for pointing out its various component parts and the installation position thereof, the machine 5 is substantially constituted by a box-like cabinet 6 with reduced and compact dimensions, having a limited height and width and depth smaller than those of the height, which cabinet is composed of various profiled parts which are joined removably to each other in a per se known manner, and the front wall 7 of the cabinet 6 is provided with a vertical through opening 8, in the upper part of which it is situated a filtering unit 9 for housing a waffle or a capsule or the loose powder of the desired beverage to be prepared; and for delivering the infused beverage which is prepared. In turn, in the lower part of the vertical through opening 8 the cup support 10 is situated (which optionally can be regulated in its height), adapted to support the cup or glass 4 where the beverage delivered by the unit 9 is poured, which support is moved away with respect to the overlying filtering unit 9. The filtering-delivering unit is substantially constituted by an upper stationary portion (cylindrical head 52 with valve 53) and a lower one (filter supporting body), on to which the waffle support filter or ground coffee support filter or the appropriate capsule support is positioned, which portion is adapted to be displaced in a vertical direction from a lowered position to a raised position thereof with respect to the upper stationary portion of the filtering unit, for the grounds which will be described later on, and the displacement movement of such lower portion from the one to the other one of the lowered and raised positions is determined by an underlying regulating handle 11, co-operating with such movable portion as it will be described further on, and slidable in an alternate horizontal direction along a corresponding horizontal through opening 12, provided in the lower part of the front wall 7 of the box-like cabinet 6. Moreover, in the upper part of the front wall of the cabinet 6 there are situated some control push buttons 13, 14, and 15, or equivalent means, which are actuated selectively by the user for performing the machine operative functions which will be described. Besides, in the side wall 16 of the cabinet 6 a door 17 is hinged, delimiting an inner cavity (not indicated) in which a water container for preparing the infused beverage is arranged and housed, which container may be advantageously shaped like a bottle, or also with different forms and is capable to contain a water quantity enough to prepare several doses of infused beverages. Finally, in some possible described versions, the machine is also provided rearward with one or more supply cables (18-91-96) under DC voltage, for example at 12 V or 24 V, and/or AC voltage for example at 127 or 230 V, for supplying the various electric components of the machine with a low DC voltage, for example at 12 or 24 V, and/or an AC voltage for example at 127 or 230 V.

Figure 6:
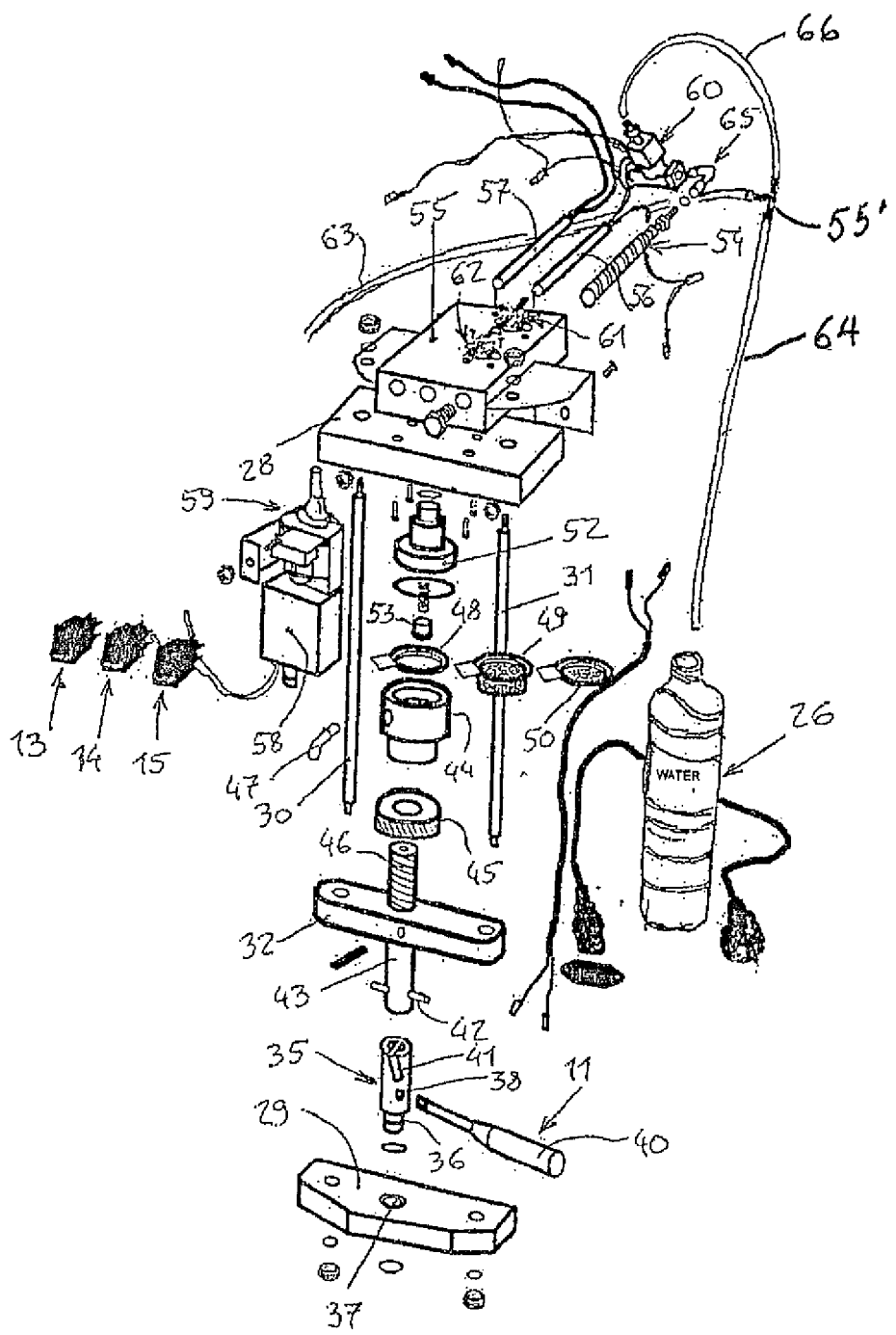
FIG. 6 shows a perspective front and exploded view of all the component parts of the machine according to the invention.

All the functional component parts of the machine, which will be described later on, are supported on and secured to a metallic box-like structure formed by a rectangular shaped back and vertical plate 19, and two horizontal upper brackets 20 and an horizontal lower plate 21, spaced away vertically from the brackets 20 and shaped with rectangular form, which is secured to the back vertical plate 19. Furthermore, such structure comprises a further vertical plate 22, shorter than the back vertical plate 19 and of rectangular form, which is bent at its upper part at 90° until to join the vertical plate 19, to which it is secured, and it is also secured at its upper part to the brackets 20 and at its lower part to the plate 21, in such a way that a space be defined between such further vertical plate 22 and the front terminal edges of the front brackets 20 and the front terminal edges 23 of the horizontal lower plate 21, which space is provided for mounting the filtering and delivering unit which will be described hereinafter. Finally, said box-like structure also comprises an additional vertical plate 24 (see FIG. 4), which is secured at a central position between the vertical plates 19 and 22, in an orthogonal direction to the same plates, thereby defining two inner cavities separate from each other, of which the cavity 25 (see FIG. 3) acts for housing the water container 26, which in the illustrated example is shaped like a bottle (in case also of small dimensions), and such cavity is accessible through the above described door 17. In turn, the other inner cavity 27 of the box-like structure (see FIG. 4) acts for housing the functional component parts of the machine which will be described soon. By referring again to the FIGS. 2-5 and to the FIG. 6 too, in which all the disassembled component parts of the machine are illustrated, it is noted that in the front space for mounting the filtering and delivering unit there are situated an horizontal upper fixing plate 28 and an horizontal lower fixing plate 29, which are spaced away vertically from each other for allowing the arrangement of such filtering and delivering unit therebetween, as well as the alternate vertical displacement with a determinate stroke of the lower part of the same unit, and to this aim such fixing plates 28 and 29 are secured respectively below and above the upper brackets 20 and the lower plate 21, and are joined to each other and to the above brackets 20 and lower plate 21 by means of two vertical cylindrical support rods 30 and 31, identical and spaced away to each other in the machine longitudinal direction, thereby delimiting the space for mounting the filtering and delivering unit and the regulating handle 11.

An horizontal movable saddle 32 is also inserted between the support rods 30 and 31 an supports the filtering and delivering unit, said saddle being provided with two side vertical through holes 33 and 34, into which the relative rods 30 and 31 are inserted, in a manner that such saddle 32 is slidable vertically and alternately along the same rods, together with the filtering and delivering unit, from a lowered to a raised position thereof, and vice versa, and this vertical sliding of the saddle 32 is obtained by means of a transmission mechanism co-operating with the same saddle and the handle 11, and operated by the same handle. This transmission mechanism (see FIG. 6) is constituted by a short vertical cylindrical sleeve 35, shaped with a lower cylindrical stud 36 of smaller diameter, which is inserted and adequately secured into a corresponding hole 37 of the lower fixing plate 29, in a way that such sleeve may rotate within limits with respect to the lower plate 29, such cylindrical sleeve being also provided with a radial bore 38 in which the end portion of a clamping lever 39 is inserted, in the other end portion of which it is inserted the handle element 40 of the regulating handle 11. The upper end portion of the cylindrical sleeve 35 is shaped with a helical slot 41, which can be coupled removably with a correspondent cross shaped joint 42 secured to a shaft 43 integral with the saddle 32 at its lower part, in such a manner that the rotation of the handle 11 in either one of its rotation directions determines the consequent rotation of the sleeve 35, and that the coupling of the cross shaped joint 42 with the helical slot 41 of the sleeve therefore provides for the raising or lowering of the saddle 32, slidable along the guide members formed by the vertical cylindrical rods 30 and 31. Of course, according to the invention it is also possible to shape in a different manner the just described transmission mechanism, as well as to actuate manually such transmission mechanism with actuation devices different than the handle 11, or automatically and/or electrically, thus without departing from the protection sphere of the same invention. As usual, the filtering and delivering unit is constituted by a filter supporting body 44 of cylindrical or polygonal form, made of plastic material or other suitable material, shaped for being coupled with an underlying regulating ring nut 45, which in turn can be screwed and unscrewed with respect to a correspondent screw 46 secured on to the slidable saddle 32, and constituting a projection of the shaft 43 and integral therewith, and such filter supporting body 44 is provided with an inner chamber (not shown) for the passage of the infused beverage, and a side spout 47 curved downward and communicating with the inner chamber, for delivering the infused beverage into a glass or another receptacle which is disposed below the same spout. The upper part of the filter supporting body 44 is shaped for housing a correspondent thin cup 48 acting as support for the capsule containing the metered and pressed powder of the relative beverage to be prepared, or a filter for receiving the loose powder of the beverage to be prepared, or a filter for receiving the paper waffle. In the FIG. 6 it is noted a filter 49 for receiving the loose powder of coffee or other infused beverage which, when is laid on to the filter supporting body 44, allows to prepare the beverage by infusion of the hot water, which is obtained as it will be described hereinafter, through such loose powder of beverage. In this Figure, it is also noted that such filter 49 may be replaced with a further filter 50 for receiving a paper waffle or a cup 48 for housing the plastic capsule, so as to prepare the beverage by infusion of hot water through the waffle or the capsule. Therefore, the so constituted filtering and delivering unit is of versatile type and permits to prepare the infused beverages anyway, by replacing from time to time a filter with another type of filter, which condition cannot be attained with the currently used filtering units, which are foreseen only for receiving the loose powder or the waffles of a beverage, or loose powder or also capsules of a beverage, and which aren't interchangeable to each other. Above and in correspondence of the just described filtering and delivering unit there are arranged a cylindrical head 52 and a valve member 53, secured internally the head 52, and provided for distributing hot water toward such unit, and such component parts are suitably fixed below the upper plate 28, and communicating with a heat exchanger 55 formed by a box-like body, which is milled and turned, and contains a conduit crossed by the cold water to be heated and made of a good thermal conductor material, having high thermal inertia, for example of brass or aluminium for alimentary uses, which is secured into a correspondent position on to the upper plate 28, which heat exchanger is heated by one or more electric heating elements, which are constituted by at least a DC voltage powered heating element 56, with a supply voltage for example of 12 or 24 V, and which can be realized with reduced power (for example, 300 W), to which additional heating elements of the same kind may be possibly added.

Figure 7:
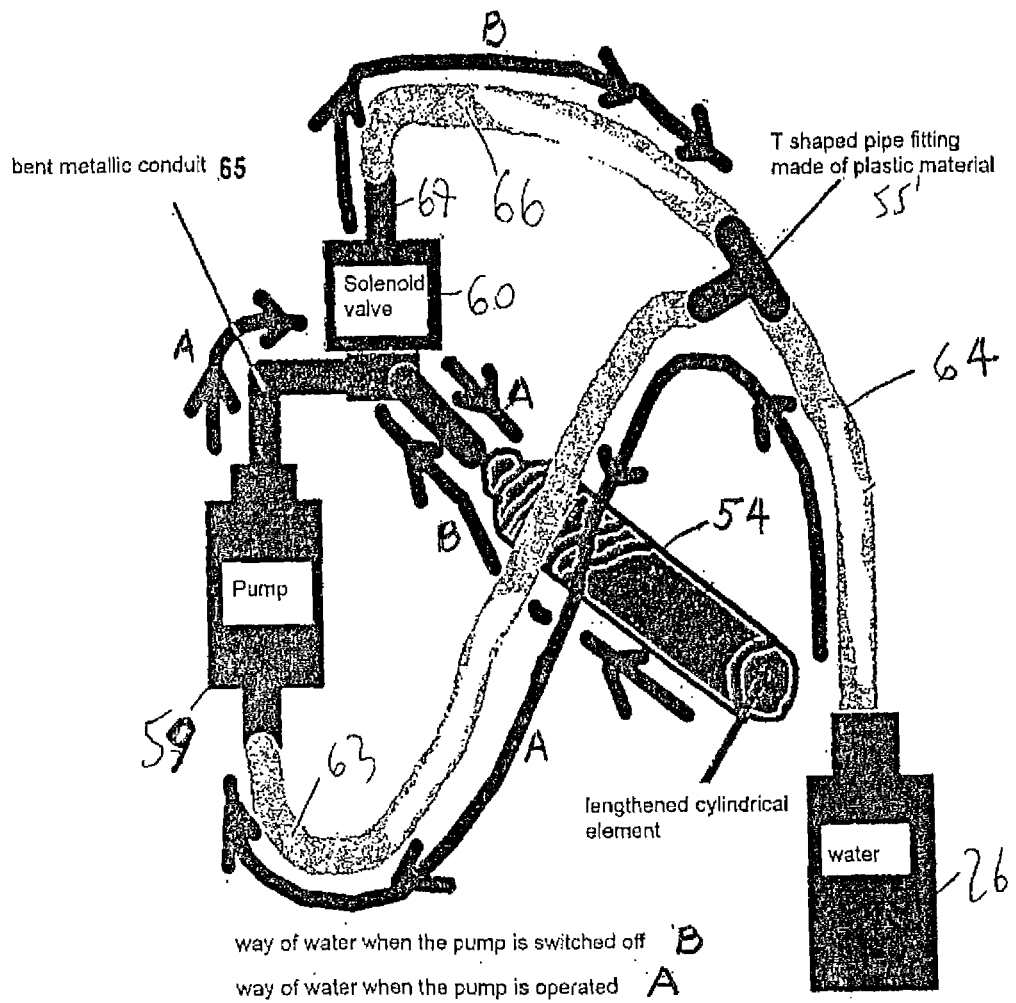
FIG. 7 shows a schematic view of the different component parts of the hydraulic circuit of the machine.

Such heating elements may also be integrated or replaced by at least a further AC voltage powered heating element 57 (for example of 120 or 230 V), which is supplied directly by the electric supply line, independently from the DC voltage powered heating elements. Further functional component parts of the machine are constituted by a pump 59 provided with an electronic device 58 allowing an inlet DC voltage supply (for example, of 12 V), which device is also able to stop the machine operation if the voltage level of the supply battery lowers below a determinate value, such device being able to be connected also to an electronic card (not shown) for controlling the different electric components and set the machine operative cycles. Such electronic card can be connected to the electric control and regulating push-buttons, or equivalent technical means, for example a touch control, which in the example referred to are constituted by the above mentioned three push-buttons 13, 14 and 15, provided respectively for switching on or off the machine, for commutating the heating elements with the DC voltage or the AC voltage electrical supply, and for determining or not determining the delivery of hot water for preparing the infused beverage. The machine is also constituted by the following electric component parts: at least a circulation pump 59, at least a three-way solenoid valve 60 and a set of thermostats, in the example constituted by the thermostats 61 and 62, the circulation pump 59 which is housed, with the electronic device 58, in the inner cavity 27 of the box-like structure of the machine, which is opposite to and separated from the cavity 25 for housing the water container 26, while the three-way solenoid valve 60 is situated above the upper plate 20 and the thermostats 61 and 62 are secured above the box-like container 55 of the heat exchanger. As particularly visible also from the FIG. 7, the circulation pump 59 is connected with its sucking side, through a flexible conduit 63 and a further flexible conduit 64, to the water container 26, so as to suck the cold water coming from the same container, when the push-button for controlling the delivery of the beverage 15 is actuated, in order to switch on the same pump, and such pump 59 is also connected with its delivery side to the inlet of the solenoid valve 60, through a pipe fitting formed by a bent metallic conduit 65 intercepted by the inner valve member of the same solenoid valve, and the outlet of which is joined to the inlet of the inner conduit of the heat exchanger 55, by way of an appropriate lengthened cylindrical element 54, wherein the outlet of such inner conduit is communicating with the water distributing unit (head 52 and valve member 53).

Moreover, the solenoid valve 60 is also connected to the cold water container 26, through a further flexible conduit 66, joined to the flexible conduits 63 and 64 through a T shaped pipe fitting 55' made of plastic material, and which at the other side is joined to the third mouthpiece 67 of the solenoid valve 60, so as to discharge water contained inside the heat exchanger 55 when the delivery of the beverage is ended, and to avoid in this way the limestone to be formed. When the circulation pump 59 is operated by actuating the control push-button 15 in the switching on position of the pump, the cold water contained into the container 26 is sucked by the same pump through the flexible conduits 63 and 64 and conveyed through the rigid conduit 65 into the heat exchanger 55, and at the same time the discharge outlet of the valve toward the flexible conduit 66 is closed, since also the solenoid valve 60 is actuated contemporaneously to the pump 59, and water into such heat exchanger is heated in a short time and then is delivered through the head 52 and the valve member 53 toward the underlying filter, where the infused beverage is produced and then collected in the underlying receptacle.

When, at the end of the delivery cycle, the push-button for delivering the beverage is actuated to stop the delivery and switch the pump 59 off, the solenoid valve 60 is actuated contemporaneously so as to open the discharge way leading to the flexible conduit 66, so that the residual water present into the heat exchanger 55 is discharged into the container 26, thereby avoiding the risk to form limestone inside the system and therefore ensuring a longer life duration of the same system. Finally, the thermostats 61 and 62 are foreseen for safety reasons and for controlling the temperature of the relative heating elements, and are calibrated for switching them on and off when the respectively pre-established heating temperature is attained, so as to keep always hot the heat exchanger, and thus heating water quickly during each delivery cycle of the desired infused beverage. In the so realized machine, before to start a cycle for preparing a type of beverage, it is necessary to establish if the machine should be loaded with loose powder, or with a waffle or a capsule containing the powdered beverage. To this purpose, under this starting condition the movable saddle 32 is displaced, with the filter supporting body 44, in the lowered position and moved away with respect to the cylindrical head 52 and the valve member 53 for distributing hot water, so that into the cup 48 of the filter support 44 it may be introduced the capsule with the metered and pressed powder of the beverage to be prepared, or into the filter support it may be inserted the filter for receiving the paper waffle, or the filter for receiving the loose powder of the beverage to be prepared. As soon as one of these elements for preparing the beverage has been introduced into the filter support 44, the regulating handle 11 is actuated in such a direction as to provide for raising the filter support 44, and therefore the cup 48 supporting the capsule or the filter for supporting the waffle or the filter for supporting the powder, with the same element, and this raising continues until such element is put into contact below the assembly head 52-valve member 53 and is then adhered against such assembly.

Afterwards, the infusion cycle is started as described previously, for such a duration as to deliver the desired quantity of the selected beverage into the underlying glass or receptacle. Finally, when the infusion cycle is terminated, the regulating handle 11 is displaced in a direction opposite to the preceding one, with consequent lowering of the saddle 32 and the filter support 44, and extraction of the exhausted element from the cup 48, or of the waffle or the powder, and arrangement of the machine for performing a subsequent infusion cycle with the same described criteria. The so constituted machine may be constructed with more reduced and compact dimensions, by dimensioning adequately all the cited component parts and the water container 26, and may be also operated with an electric resistance having even a reduced power (for example 150 W), so as to be installed into very restricted spaces and may be also utilized for example with a specific electric lighter socket for a car.

Figure 8:
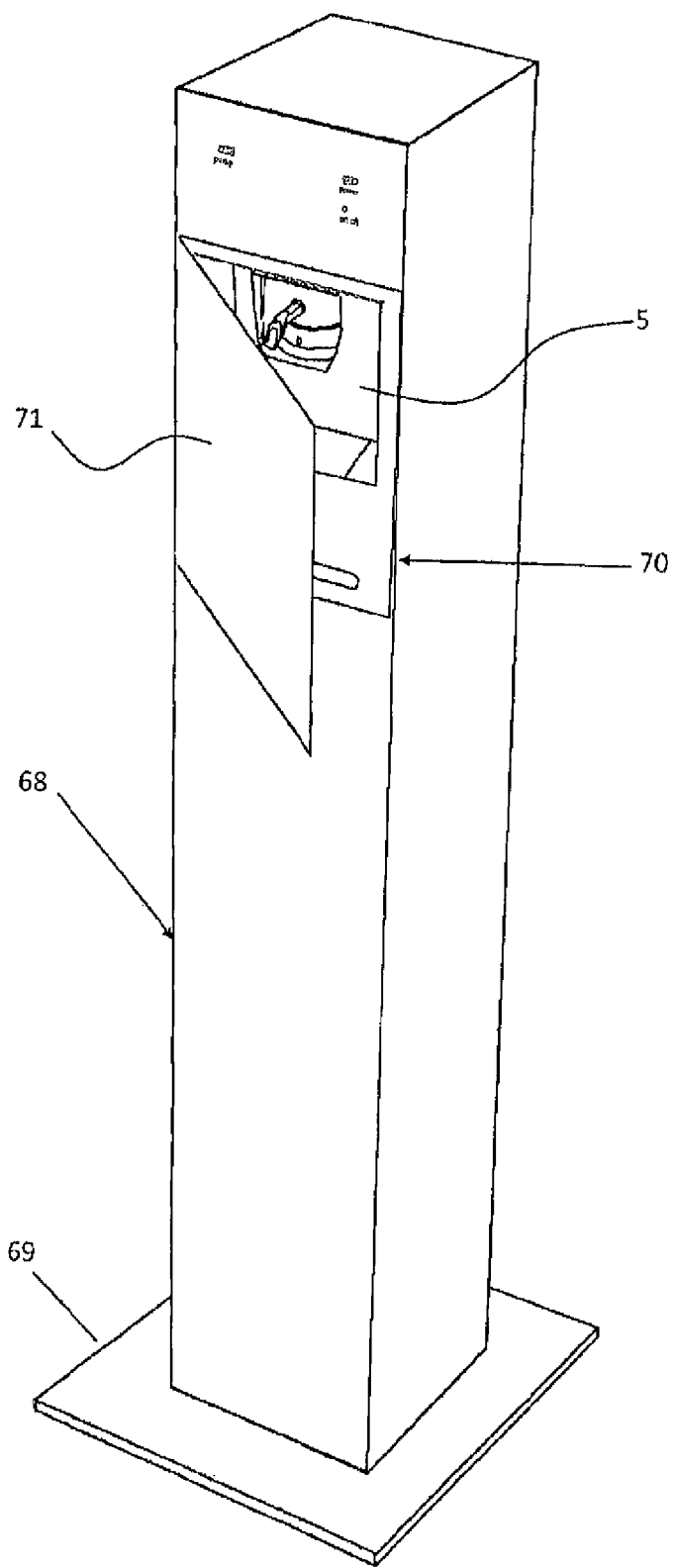
FIG. 8 shows a perspective front view of the present machine, assembled into a column to be laid onto the ground.

In the FIG. 8 it is now shown the present machine with or without included battery, in which the machine is installed into a vertical lengthened column 68, the structure of which is made based on the metacrylate or plastic material or glass, or painted sheet or stainless sheet, or material of another kind, which column is provided with an enlarged lower base 69 which can be laid into position on to a horizontal surface (floor, foundation, etc.), and in the example illustrated the machine is inserted into a correspondent upper space 70 of the column 68 and is accessible through a front door 71. Such column with included machine may be advantageously utilized for domestic or commercial use.

Figure 9:
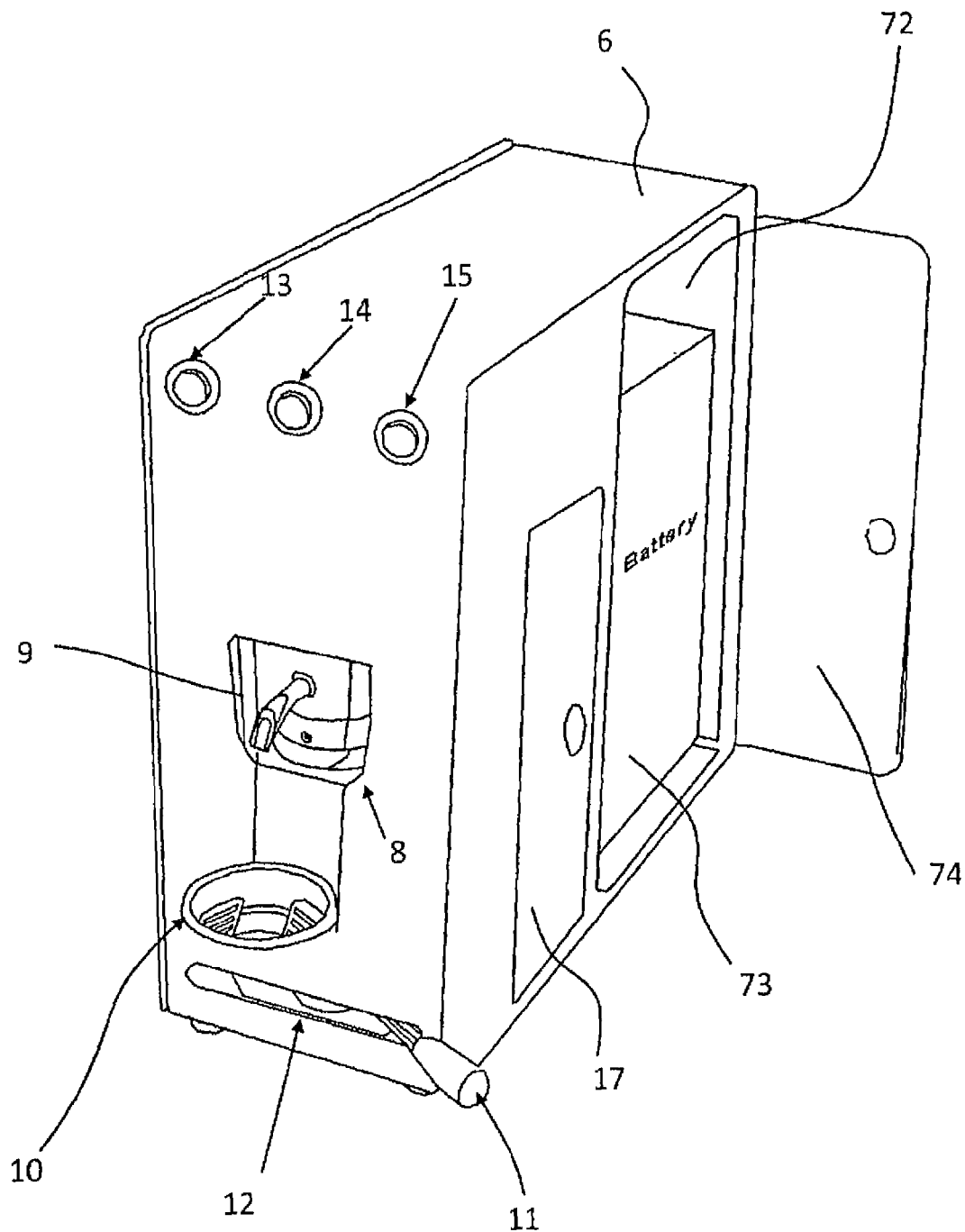
FIG. 9 shows a perspective front view of the present machine, with an included battery and on a first portable version thereof.

In the FIG. 9 it is shown the machine in a first portable version thereof, in which the machine cabinet 6 is realized with a depth greater than the previous one, so as to define another space 72, adjacent to the space of the water container, into which a battery 73 is housed, and accessible through a front door 74, so as to supply with low DC voltage the electric component parts of the same machine.

Figure 10:
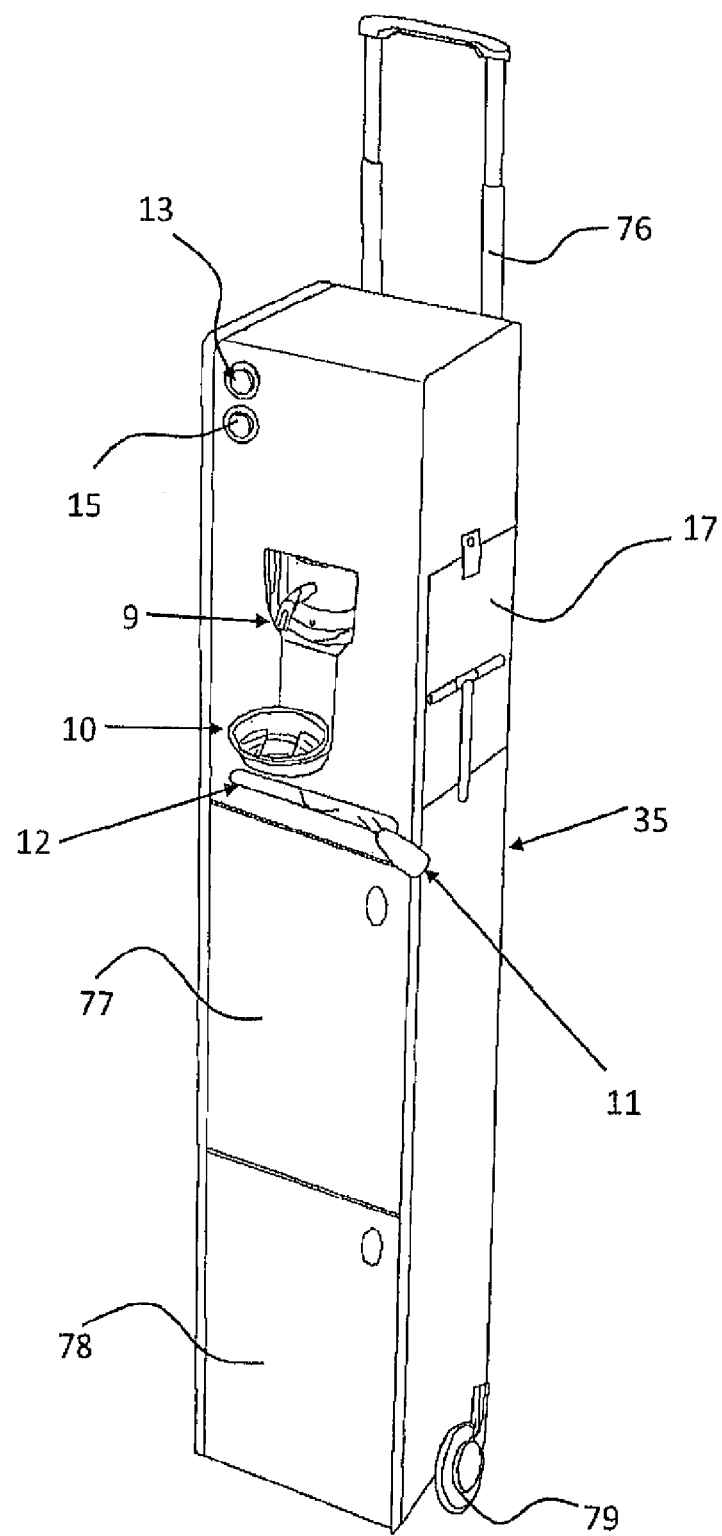
FIG. 10 shows a perspective front view of the machine of FIG. 9, on a second portable version thereof, assembled on to a transport truck.

In the FIG. 10 it is shown the machine in a second portable version thereof, mounted on to a vertical transport truck 75, shaped preferably like a hand luggage with an upper handle 76 having an adjustable extension, which truck is shaped with a form lengthened in the vertical direction, and is provided with a set of spaces overlapped to each other, and provided with a battery which is included into the upper space (not indicated) of the truck, and the water container is always inserted into such space and accessible through a door 17, and the truck is also provided with two additional underlying spaces, accessible through relative front doors 77 and 78 and are adapted to contain the ingredients for preparing the beverages (glasses, powdered beverages, sugar etc.) and any possible article of various kind, and finally some sliding wheels 79 are pivoted in the lower part of the same truck, such truck being able to house also at least a machine for delivering infused beverages of different type and construction.

Figure 11:
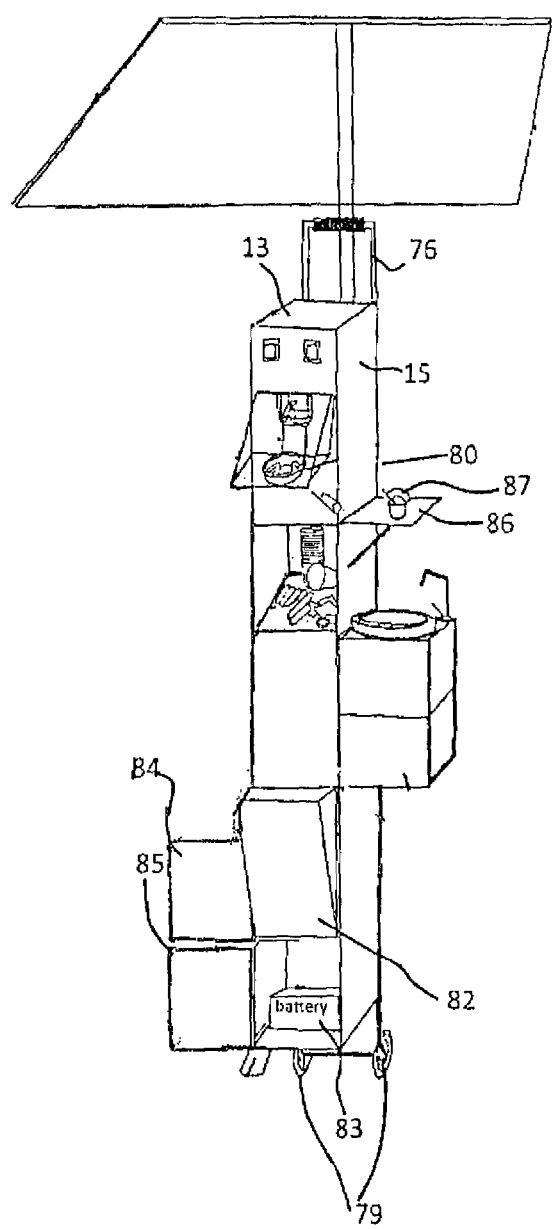
FIG. 11 shows a perspective front view of the machine of FIG. 9, on a third portable version thereof, assembled on to a different transport truck.
Figure 12A:
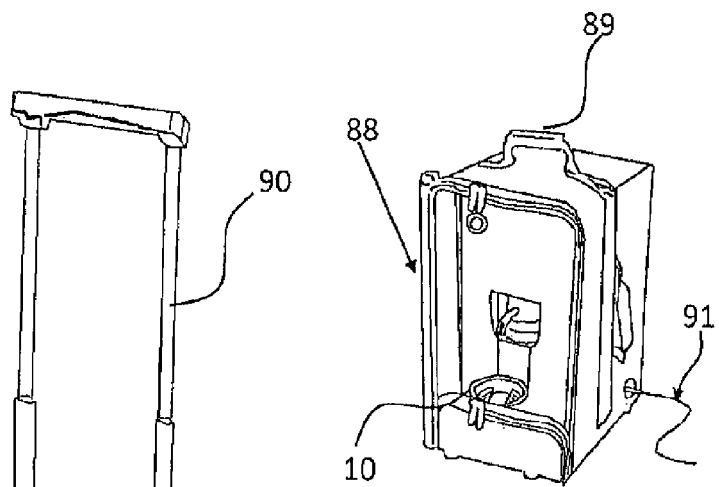
FIGS. 12 and 13 show a perspective front view of the machine on further portable versions thereof.
Figure 12:
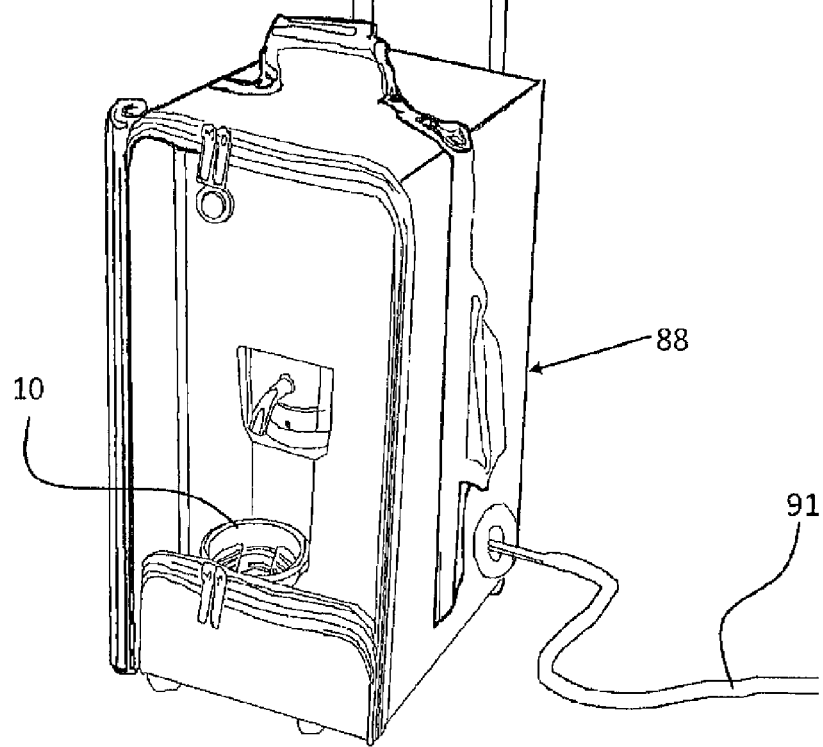
Figure 13:
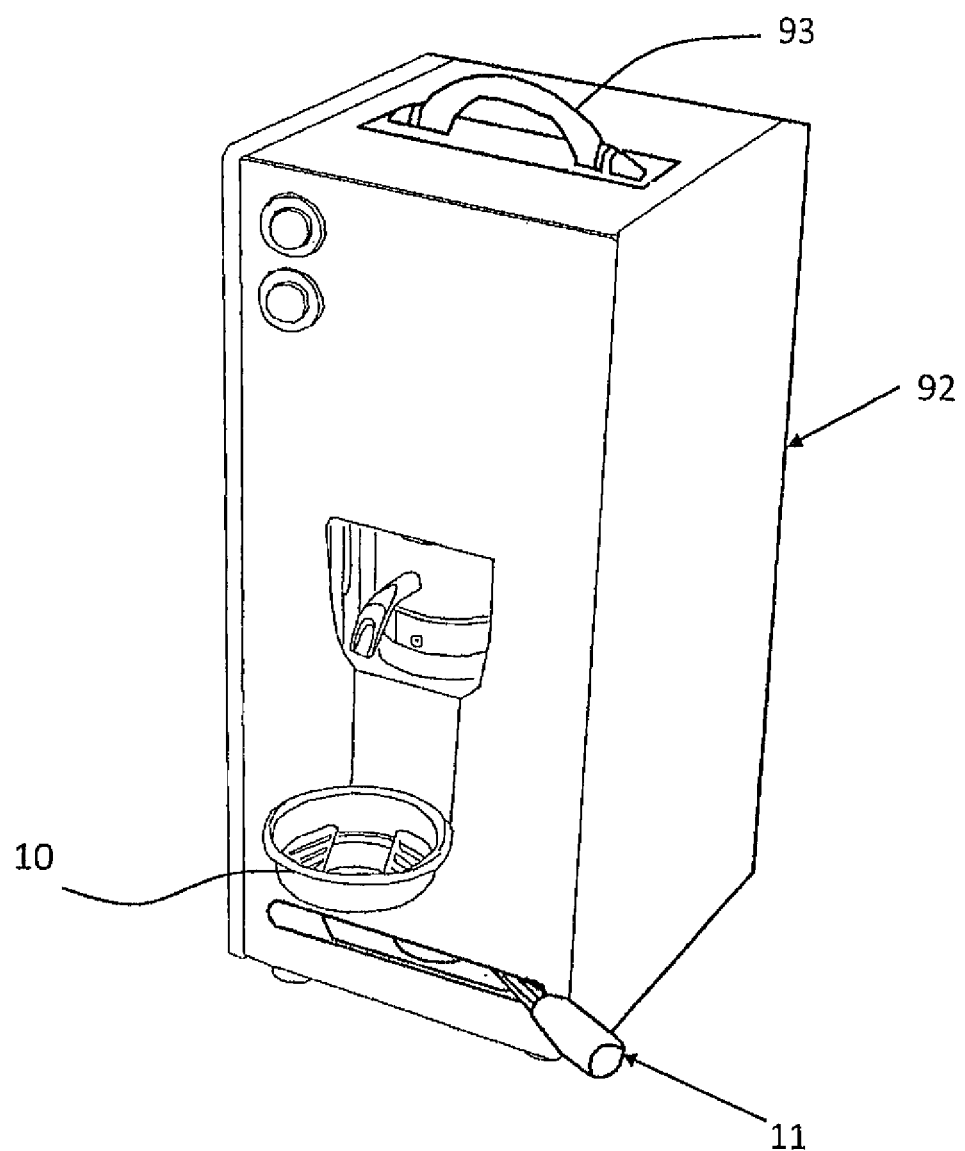
Figures 14, 14A:
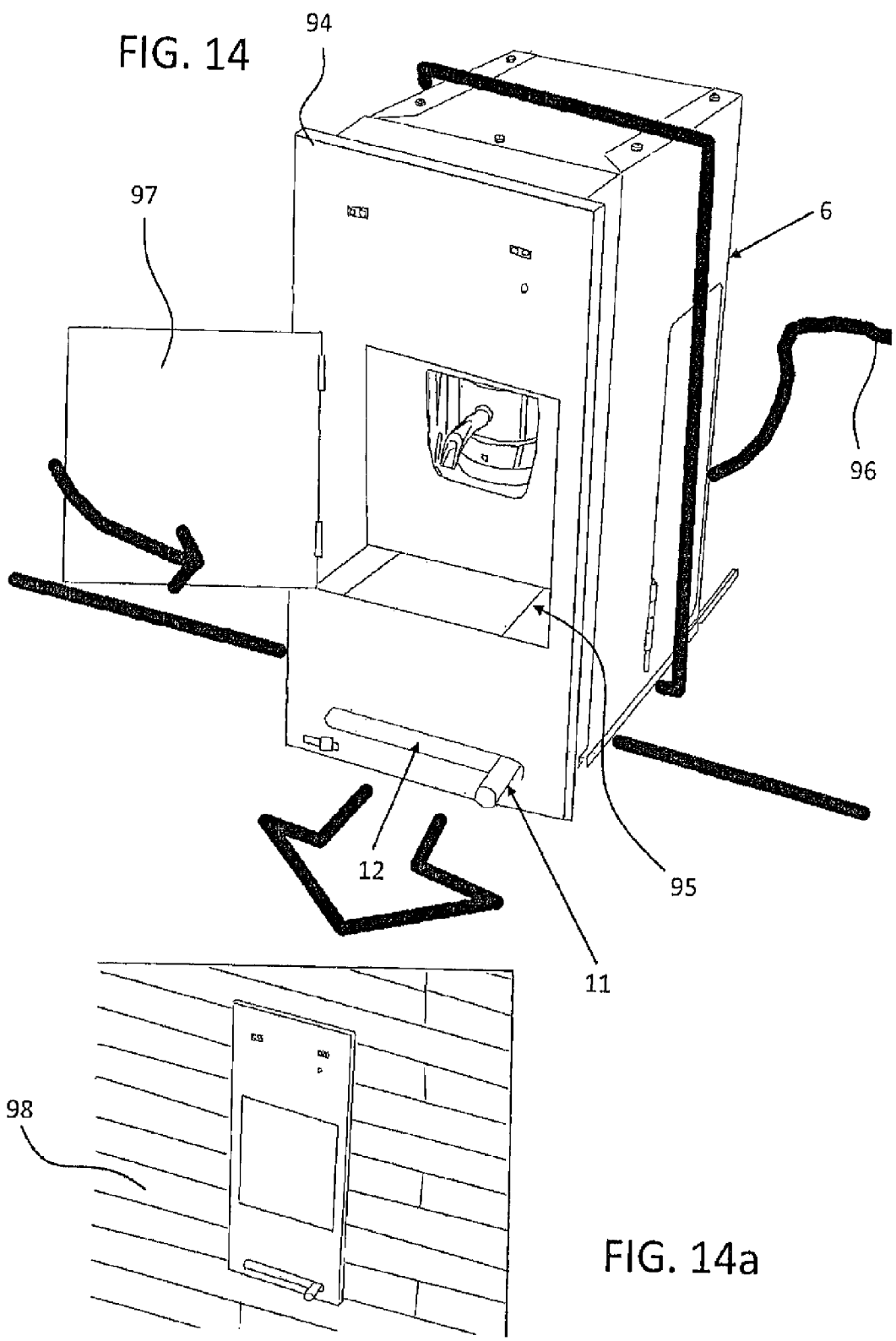
FIG. 14 shows a perspective front view of the machine on a built-in version.

In the FIG. 11 it is shown a machine on a third portable version thereof, again mounted into the upper space of a vertical transport truck 80, identical but higher with respect to the preceding truck 75 of FIG. 10, and provided with two underlying spaces 81 and 82 for housing the ingredients for preparing the beverages and a battery 83. Besides, in this case the truck supports additional overlapped spaces adjacent and lateral 84 and 85 and a projected side support 86 for supporting the beverage receptacle 87. Of course, the trucks 75 and 80 may be also realized with a horizontal extension instead the vertical one, and with different shapes and dimensions, and may comprise a different number of spaces for containing the ingredients for preparing the infused beverages, and articles of various kind (for example, waste basket etc.) and appliances of different type and construction and with various functions and which can be connected in different manners to the battery, and also for example a mini-refrigerator etc. . . . , and a sink provided with a tap, pump, supply and discharge reservoirs etc. . . . , and one or more water containers added or alternative to the container 26, and may as well be provided with additional fittings for performing different functions, like protection coverings, pedals for opening the doors of the spaces and the like, thus without departing from the protection sphere of the present invention. In the FIG. 12 it is shown a machine on another portable version thereof, in which it is included into and supported by a protection and transport bag 88, provided with two handles one of which is fixed 89 (FIG. 12 *a*) and the other one is of extensible type 90, and an electric supply cable 91 to supply the different electric component parts of the same machine. In the FIG. 13 it is shown a machine on still another portable version thereof, in which it is identical to that of FIG. 1 and is provided with external side protections 92 and having an upper transport handle 93. Finally, in the FIG. 14 it is shown a machine on the built-in version thereof, and the cabinet 6 of which is arranged for being built into a wall, the furniture etc., and to this purpose a peripheral frame 94 is secured to the front part of the machine cabinet 6, which frame is projected outward and larger than the machine front wall, and made of various materials such as for example glass or steel, and a central through opening 95 for accessing the machine is provided through the frame 94, together with a lower through opening 12 for the regulating handle 11, and the machine is also provided with an electric supply cable 96, while the opening 95 may be closed by a correspondent door 97. In the FIG. 14 *a* it is shown an example of the built-in machine, in which the assembly frame-machine is built into a correspondent opening provided through a vertical wall 98 of a room, wherein such machine may be provided with rails for extracting and filling up the container 26, or it may be placed on a stationary position and the container may be separated from the machine and disposed on an area where it may be easily filled up, or alternatively the machine may be supplied directly by the hydraulic supply line, for example of the plant of a watercraft or a camper or a Pullman car.

Of course, the machine may be also additionally coupled to steam elements for preparing white coffee.

The invention claimed is:

1. A machine (5) for preparing an infused beverage electrically powered by DC battery power of 12 or 24 volts and/or AC electrical mains, said machine being housed within a cabinet (6) having a support structure therein for supporting said machine, said machine comprising a heat exchanger (55) having electric heating elements (56) for heating water for the infused beverage, a pump (59) for pumping the water for the infused beverage from a cold water container (26) housed in said cabinet and conveying the water to said heat exchanger (55), a thermostatic control (61, 62) for controlling the temperature of said heating elements (56) connected to the DC and/or AC electrical supply circuit;

a filtering and delivering unit (52, 53; 44; 48, 49, 50) for the infused beverage in fluid communication with said heat exchanger (55) for delivering the prepared infused beverage into an underlying receptacle (4), an electronic control (58) operated by selector switches (13, 14, 15) for controlling the electrical elements and operative cycles of said machine (5) and adapted to stop machine operations in the event the voltage of the battery supply is below a predetermined value;

a three-way solenoid valve (60) in fluid communication via a first conduit series (63, 64, 65) with said container (26) and with said heat exchanger (55) for transferring water from said container (26) to said heat exchanger (55), and via a second conduit series (66, 64) for discharging water into said container (26) from said heat exchanger (55) when delivery of the infused beverage is ended;

said filtering and delivering unit comprising an upper stationary or delivery portion (52, 53) in fluid communication with said heat exchanger (55) and a lower movable portion comprising a filter portion (48, 49, 50) housed in an upper part of a filter supporting body (44) configured so as to accept therein powdered beverage of the beverage to be prepared in a form selected from the group consisting of loose powder, a capsule containing metered and pressed powder, and a paper waffle containing metered and pressed powder, said filter supporting body (44) being joined at a lower part to a vertically sliding saddle (32) actuated by a transmission element (35, 11) so as to slide vertically from a lowered position spaced from said upper stationary portion (52, 53) whereby the loose or packaged powder of the infused beverage to be prepared is introduced into said filter supporting body (44), to a raised position adjoining said upper stationary portion (52, 53), wherein the heated water is passed through the loose or packaged powder of the infused beverage to be prepared, and wherein from the raised position said vertically sliding saddle (32) is lowered via said transmission element (35, 11) so as to permit discharge of the exhausted loose or packaged powder of the infused beverage from said filter supporting body (44).

2. The machine according to claim 1, wherein said support structure comprises two horizontal upper brackets (20) and a horizontal lower plate (21), spaced vertically from said brackets (20) and having a rectangular shape, which is secured to a first back vertical plate (19), and by a second vertical plate (22) shorter than the first back vertical plate (19) and of rectangular shape, which is bent at its upper part at 90° so as to join said first vertical plate (19), to which it is fixed, and is secured at its upper part to said upper brackets (20) and at its lower part to said lower plate (21), whereby between said second vertical plate (22) and front terminal edges of said upper brackets (20) and front terminal edges (23) of the horizontal lower plate (21) a space is defined, for mounting said filtering and delivering unit, said support structure further comprises an additional third vertical plate (24), which is secured on a central position between the first and second vertical plates (19 and 22), in an orthogonal direction thereto thereby defining two separated inner cavities of which a first cavity (25) houses said water container (26), and a second inner cavity (27) houses pump (59) and said electronic control (58).

3. The machine according to claim 2, wherein in the front space for mounting said filtering and delivering unit there are situated an horizontal upper fixing plate (28) and a horizontal lower fixing plate (29), spaced vertically to each other for allowing the arrangement between them of said filtering and delivering unit, and the vertical displacement with a given stroke of the lower movable portion of the said unit, said upper and lower fixing plates (28, 29) being secured respectively below and above said upper brackets (20) and said lower plate (21), and joined to each other and to said upper brackets (20) and said lower plate (21) by two vertical support rods (30 and 31), identical and spaced from each other, and wherein between said support rods (30 and 31) said vertically sliding saddle (32) is also arranged, and supports said filter supporting body (44) and is provided with two side vertical through holes (33 and 34) into which said support rods (30 and 31) are inserted whereby the saddle (32) is adapted to slide vertically and alternately along said support rods from said lowered and raised positions thereof.

4. The machine according to claim 3, wherein said transmission element comprises a short vertical cylindrical sleeve (35) having a lower cylindrical stud (36) of smaller diameter insertable into a corresponding hole (37) in said lower fixing plate (29), so that said cylindrical sleeve may rotate with respect to said lower plate (29), said cylindrical sleeve (35) having a radial bore (38) in which a first end portion of a clamping lever (39) is inserted, in a second end portion of said clamping lever a handle element (40) of a regulating handle (11) is inserted, wherein an upper end portion of said cylindrical sleeve (35) is shaped with a vertically arranged helical slot (41), which is detachably coupled with a corresponding T-shaped joint (42) arranged on a stud (43) extending from a lower part of said saddle (32) so that the horizontal rotation of the handle (11) in either direction rotates the sleeve (35) and as a result of the coupling of the cross shaped joint (42) with the helical slot (41) of the cylindrical sleeve (35) raises or lowers said saddle (32) sliding along the guide members formed by said vertical support rods (30 and 31).

5. The machine according to claim 4, wherein said heat exchanger (55) includes a conduit through which the cold water to be heated passes made of a thermally conductive material, said heat exchanger being secured to said upper plate (28).

6. The machine according to claim 5, wherein said electric heating elements comprise a DC voltage powered heating element (56) with a DC supply voltage and an AC voltage powered heating element (57) which is added or substituted to the heating element powered with DC voltage, and which is supplied directly by the AC electrical mains independently from the DC voltage powered heating element.

7. The machine according to claim 6, wherein said pump (59) is a circulation pump operatively controlled by said electronic control (58) and connected at its intake via first flexible conduit (63) and a second flexible conduit (64) with the cold water container (26) for sucking the cold water from the container when the beverage delivery operation is commenced switching on the pump, and said pump (59) is connected, at its outlet to the inlet of said three-way solenoid valve (60) via a rigid conduit (65) interrupted by an inner valve member of said solenoid valve, and a first outlet of said solenoid valve is joined to an inlet of the cold water inner conduit of said heat exchanger (55) via a cylindrical element (54), wherein the outlet of said cold water conduit is in fluid communication with the delivery portion (52, 53) of said filtering and delivery unit.

8. The machine according to claim 7, wherein a second outlet (67) of said three-way solenoid valve (60) communicates with said cold water container (26) via a third flexible conduit (66) joined to said first flexible conduit (63) and said second flexible conduit (64) via a T pipe fitting (55'), whereby when said pump (59) is operated water in said container (26) is transferred by the pump through said first (63) and second (64) flexible conduits to the rigid conduit (65) and thence into the heat exchanger (55), simultaneously the second outlet (67) of said solenoid valve (60) is closed as said solenoid valve (60) is operated contemporaneously with the operation of said pump (59), the water in said heat exchanger is heated and then delivered through the delivery portion (52, 53) to the filter portion (48, 49, 50) of the filtering and delivery unit where the infused beverage is produced and then collected in the receptacle (4), and at the end of the delivery cycle delivery of the infused beverage terminates and said pump (59) is switched off and the solenoid valve (60) is actuated at the same time to open said second pump outlet (67) so that the water remaining in the heat exchanger (55) is allowed to discharge back to the container (26) via third flexible conduit (66) and second flexible conduit (64).

\* \* \* \* \*